No. 747,711.  
PATENTED DEC. 22, 1903.  
L. M. HOLLINGSWORTH.  
EDUCATIONAL APPLIANCE.  
APPLICATION FILED FEB. 20, 1903.  
NO MODEL.
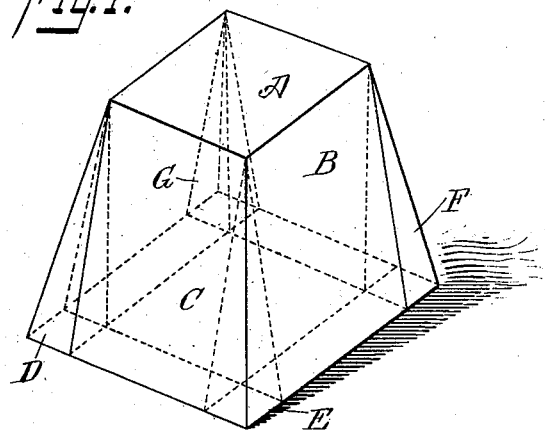
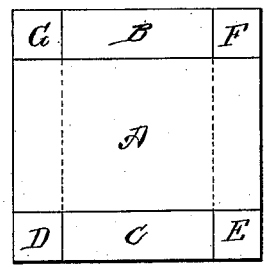
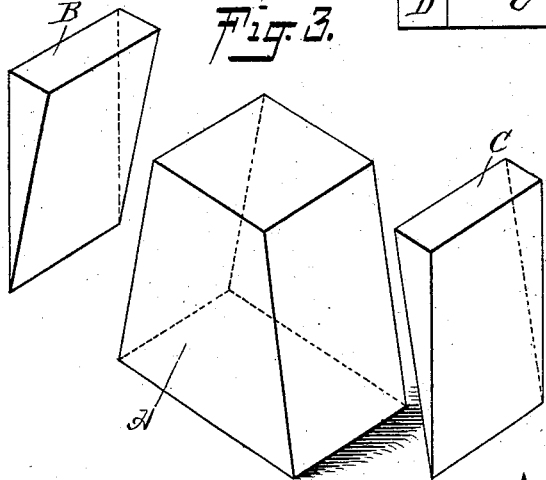
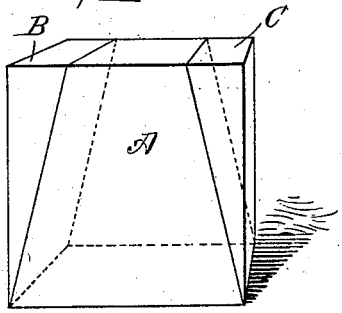
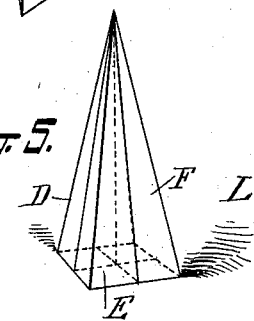
WITNESSES:  
William P. Goebel  
R. B. Cavanagh  
INVENTOR  
Landon M. Hollingsworth  
BY  
ATTORNEYS.
THE NORRIS PETERS CO., PHOTO-LITHO., WASHINGTON, D. C.

No. 747,711. Patented December 22, 1903.

UNITED STATES PATENT OFFICE.

LANDON MILES HOLLINGSWORTH, OF FRESNO, CALIFORNIA.

EDUCATIONAL APPLIANCE.

SPECIFICATION forming part of Letters Patent No. 747,711, dated December 22, 1903.

Application filed February 20, 1903. Serial No. 144,197. (No model.)

*To all whom it may concern:*

Be it known that I, LANDON MILES HOLLINGSWORTH, a citizen of the United States, and a resident of Fresno, in the county of Fresno and State of California, have invented new and useful Improvements in Educational Appliances, of which the following is a full, clear, and exact description.

My invention relates to certain novel and useful improvements in educational appliances, and has particular application to devices of the type mentioned to be used in the study of geometry and mensuration.

In carrying out the present invention I have particularly in contemplation as an object the use of a number of members which are constructed and shaped to form geometrical figures and are capable of being so arranged and assembled that various propositions or theorems of solid geometry may be easily and quickly explained and demonstrated without the necessity of indulging in a long and complicated process of mathematical computation.

A further object is to provide a means for enabling difficult problems in solid geometry to be readily and easily understood by pupils or persons who are not far enough advanced in the science to comprehend the highly technical explanations commonly found in textbooks, and, finally, I have particularly in view the illustration and demonstration of two mathematical and geometrical problems most difficult for rudimental students to comprehend. These problems are, first, the method of computing the volume of a frustum of a pyramid, and, second, the method of computing the volume of a frustum of a cone. For the sake of illustration I will in this specification confine myself to the first problem—that is to say, the method of computing the volume of the frustum of a pyramid, although it is to be understood that the volume of a frustum of a cone may be similarly computed.

The invention consists in the construction and arrangement of parts, as is herein described and claimed.

Reference is to be had to the accompanying drawings, forming a part of this specification, in which similar characters of reference indicate corresponding parts in all the figures.

Figure 1 is a view of a frustum of a pyramid formed by the assembling of all of the members or elements employed. Fig. 2 is a view of the base of the frustum so formed. Fig. 3 shows a frustum having the top or upper base equal in one dimension to the corresponding dimension of the lower base, the other dimension of the lower base being relatively longer than the similar dimension of the upper base and the two angular side members. Fig. 4 shows the blocks or members of Fig. 3 rearranged into a figure or group forming a prism, substantially a rectangular parallelepiped; and Fig. 5 shows the remaining members or the angular corner-pieces mounted to form a square pyramid.

The method universally employed for computing the volume of the frustum of a pyramid is based upon the well-known theory that "the volume of the frustum of any pyramid is equal to the sum of the volumes of three pyramids whose common altitude is the altitude of the frustum and whose bases are the lower base, the upper base, and a mean proportional between the bases of the frustum." To solve this theorem, it is first necessary for the student "to be familiar with or to demonstrate the theorem that the frustum of a triangular pyramid is equivalent to the sum of three pyramids whose common altitude is the altitude of the frustum, and whose bases are the lower base, the upper base, and a mean proportional between the two bases of the frustum." For example, assuming the volume of a triangular pyramid to be denoted by V, the lower base by B, the upper base by $b$, and the altitude by H, after a long and complicated process of computation we find that $$V = \tfrac{1}{3} H (B + b + \sqrt{B \times b_{,}})$$

but with the use of my improved demonstrating appliance only about one-third as much time and labor is required as is consumed in the ordinary methods just recited, and extraction of the square root is obviated.

In carrying out my invention in the present instance I employ seven elements or blocks, which are shown assembled in Fig. 1, such members being designated by the letters A, B, C, D, E, F, and G. For the purpose of illustration we will assume the base of the frustum in Fig. 1 to be sixteen inches square, while the top surface or upper base thereof is ten inches square and the height sixteen inches. If it is desired to ascertain how many cubic inches the frustum contains, the solution may be had as follows: The blocks, as assembled in Fig. 1, will present a base which is divided substantially as shown in Fig. 2, so that the square at the center of said lower base will be equal to the upper base, the frustum being formed in segments. Now if we cut the frustum perpendicularly from the two opposite edges of the upper base to the full cross-lines of the lower base, which may be done by removing the blocks B, C, D, E, F, and G away from the block A, we will have an arrangement substantially as shown in Fig. 3—that is, a central frustum-block having a base sixteen inches by ten inches, and the upper base ten inches by ten inches. The parts are then assembled as shown in Fig. 4, the two pieces B and C from the side of the frustum being inverted and placed against the block A, so that a prism substantially a rectangular parallelepiped is formed. The three pieces so combined, as shown in Fig. 4, form a prism containing ten by sixteen by sixteen is equal to two thousand five hundred and sixty cubic inches. The segments or blocks D, E, F, and G are then formed into a pyramid, as also seen in Fig. 4, this pyramid containing $$\frac{6 \times 6}{3} \times 16 = 192 \text{ cubic inches.}$$

The prism and the pyramid contain two thousand five hundred and sixty cubic inches plus one hundred and ninety-two, or two thousand seven hundred and fifty-two cubic inches. Hence $$\left[(10 \times 16) + \frac{6 \times 6}{3}\right] \times 16 = 2752.$$

Also $$(10 \times 16 \times 16) + \left(\frac{6 \times 6}{3} \times 16\right) = 2752,$$

from which will be seen that frustums of equal heights which are parts of pyramids or cones of equal height are to each other as the areas of their bases. In finding the contents of the frustum it will be seen that it is only necessary to take the product of the upper and lower dimensions and one-third of the square of their differences and multiply by the height or "to the product of both dimensions and height, add one-third the square of the difference between the upper and lower dimensions, multiplied by the height."

It will be observed that the blocks or members employed herein enable the above method to be illustrated and explained with great rapidity and clearness, it only being necessary to rearrange the pieces into a pyramid and a prism, as has been above described. These blocks may be of metal, wood, glass, or the like and may be also colored or marked in any desired manner.

Having thus described my invention, I claim as new and desire to secure by Letters Patent—

1. An educational appliance for demonstrating mathematical theorems, comprising a plurality of separable members, constituting when assembled the frustum of a geometrical figure.

2. An educational appliance, comprising a main member in the form of a frustum having a square upper base, and a lower base equal in width to the width of the upper base, said lower base being relatively longer than the upper base, and supplemental members adapted to be arranged relative to the main member in such manner that a frustum having a square upper base and a square lower base will be formed.

3. An educational appliance, comprising a plurality of members, adapted when assembled to form a frustum having square upper and lower bases.

In testimony whereof I have signed my name to this specification in the presence of two subscribing witnesses.

LANDON MILES HOLLINGSWORTH.

Witnesses:
SAML. JENNINGS,
O. J. WAGGONER.